J. W. Gay
Pepper Box.
No. 41,372. Patented Jan. 26, 1864.
Fig: 1
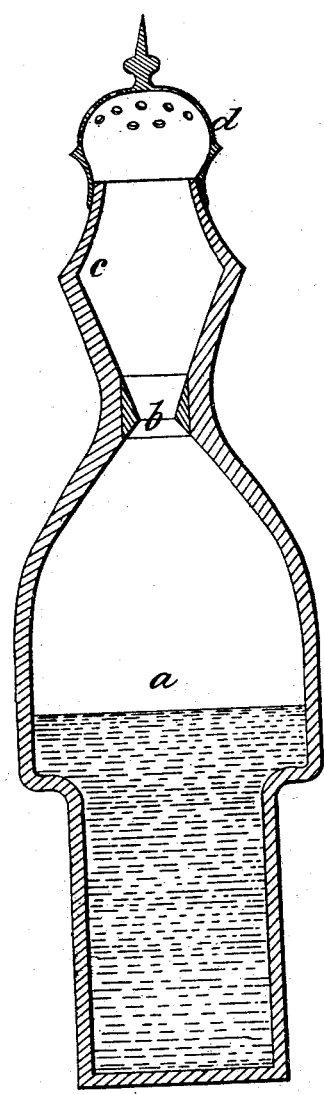
Fig: 2
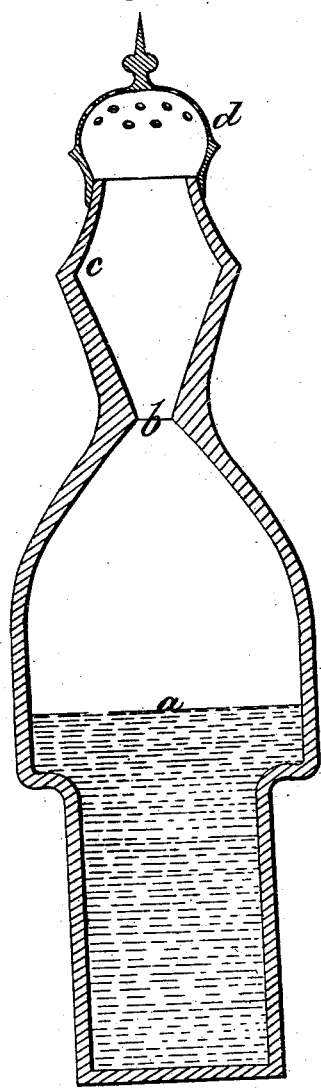
Witnesses;
Lemuel W. Serrell
Chas. R. Smith
Inventor;
John W. Gay

UNITED STATES PATENT OFFICE.

JOHN W. GAY, OF BROOKLYN, NEW YORK.

IMPROVED PEPPER-BOTTLE.

Specification forming part of Letters Patent No. 41,372, dated January 26, 1864.

*To all whom it may concern:*

Be it known that I, JOHN W. GAY, of Brooklyn, in the county of Kings and State of New York, have invented, made, and applied to use a certain new and useful Improvement in Pepper Bottles or Boxes; and I do hereby declare the following to be a full, clear, and exact description of the said invention, reference being had to the annexed drawings, making part of this specification, wherein—

Figure 1 is a vertical section of a pepper-bottle fitted with my improvement, and Fig. 2 is a similar section of a slight variation in the mode of making said bottle.

Similar marks of reference denote the same parts.

In pepper boxes and bottles two difficulties are experienced. The first is that the pepper becomes packed in the perforated top and will not shake through the same, and the second is that the top sometimes comes off and a very large surplus of pepper is deposited in the food. The first-named inconvenience arises from the weight of pepper acting through the long neck of the bottle, entirely fills the same, and the top is by that same concussion of the pepper liable to be driven off.

The nature of my said invention consists in a contraction in the neck of the bottle sufficiently small to arrest the mass of pepper as thrown forward, and only allow about as much pepper to pass as sifts through the perforations of the top. Thereby three important and useful results are attained—first, when the bottle is turned back to its usual position all the pepper falls back into the bottom of the bottle, because the mass is arrested at the contraction, and there is no neck full of pepper to become packed; second, there is no pressure of the pepper on the top, and hence that is not liable to fall off; and, third, in case of the top falling off, the pepper does not come out of the bottle, because arrested by the contraction, and only a small amount passing the same, as would be the case if distributed by the perforated top.

I have represented my pepper-bottle $a$ as of glass. It might, however, be of other material, forming a bottle or box. $b$ is the contraction in the neck $c$, which contraction may be formed by a separate piece secured in place, as in Fig. 1, or by the material itself of which the bottle or box is formed, as in Fig. 2. $d$ is the perforated top or screen.

It will be evident that the opening in the contracted part $b$ may be of any desired shape, either circular or polygonal, and that more than one hole might be used at this point, if desired, their size being smaller than wh only one hole is used.

What I claim, and desire to secure by Letters Patent, is—

A pepper box or bottle formed with a contraction in the neck, of the nature and for the purposes specified.

In witness whereof I have hereunto set my signature this 17th day of December, 1863.

JOHN W. GAY.

Witnesses:
LEMUEL W. SERRELL,
CHAS. H. SMITH.